United States Patent [19]

Mennicke et al.

[11] Patent Number: 5,158,841
[45] Date of Patent: Oct. 27, 1992

[54] HIGH-TEMPERATURE STORAGE BATTERY

[75] Inventors: Stefan Mennicke, Leimen-Gauangelloch; Walter Andres, Ludwigshafen; Gismar Eck, Karlsruhe; Wilfried Flory, deceased, late of Brühl, by Brigitte J. Waibel-Flory, heir; Bernhard Kowalczyk, Sandhausen, all of Fed. Rep. of Germany

[73] Assignee: ABB Patent GmbH, Mannheim, Fed. Rep. of Germany

[21] Appl. No.: 692,320

[22] Filed: Apr. 26, 1991

[30] Foreign Application Priority Data

Apr. 26, 1990 [DE] Fed. Rep. of Germany ....... 4013269

[51] Int. Cl.$^5$ ............................................. H01L 37/00
[52] U.S. Cl. ..................................... 429/120; 429/62; 429/112; 429/186; 206/333; 220/429; 220/453
[58] Field of Search ................. 429/62, 112, 120, 186; 206/333; 220/429, 453

[56] References Cited

U.S. PATENT DOCUMENTS

| 1,607,460 | 5/1922 | Jones | 429/186 |
| 3,784,411 | 1/1974 | Ciliberti, Jr. | 429/186 |
| 4,522,898 | 6/1985 | Esrom | 429/120 |

FOREIGN PATENT DOCUMENTS

| 2548813 | 5/1977 | Fed. Rep. of Germany | 429/186 |
| 0048072 | 5/1981 | Japan | 429/186 |

Primary Examiner—Brian E. Hearn
Assistant Examiner—M. Nuzzolillo
Attorney, Agent, or Firm—Herbert L. Lerner; Laurence A. Greenberg

[57] ABSTRACT

A high-temperature storage battery is bounded by a thermal insulation and has an inner space in which electrically interconnected storage cells are disposed and secured. The storage cells are secured in such a way that an adequate cooling and heating of the storage cells is made possible. In order to form a storage cell block, the storage cells are embedded in a sealing compound or a course-grained loose material. Cooling devices are integrated in the storage cell block or disposed on the outside directly adjacent the block for conducting heat to the block. Heating elements are provided for heating up the storage cells.

12 Claims, 6 Drawing Sheets

HIGH-TEMPERATURE STORAGE BATTERY

The invention relates to a high-temperature storage battery having a thermal insulation which is bounded by an inner and an outer casing part, interconnected storage cells being disposed in an inner space, and at least one heating device and one cooling device for the storage cells.

Such high-temperature storage batteries, which are assembled from electrochemical storage cells based on alkali metal and chalcogen, are being increasingly used as an energy source for electric vehicles. The heretofore-known high-temperature storage batteries with electrochemical storage cells of the above-mentioned type operate at a temperature of about 350° C. In order to avoid heat losses within idle periods of the high-temperature storage batteries, they are surrounded by a thermal insulation. The thermal insulation is bounded by a double-walled casing, with the space between the walls being evacuated and filled with an insulating material. The inner space of the insulation serves for receiving the storage cells. Retainers are provided in order to be able to hold the storage cells in the desired position. Since the storage cells have to be cooled during operation of the high-temperature storage battery, but on the other hand they have to be kept at a minimum temperature during the idle periods of the battery, if necessary with the aid of a heating device, the retainers have to be constructed in such a way that each storage cell experiences the required heating or cooling.

In the case of the heretofore-known retainers, it is often not possible to carry away the heat produced during operation of the high-temperature storage battery. Another problem is uniform heating of the storage cells during the idle periods.

It is accordingly an object of the invention to provide a high-temperature storage battery, which overcomes the hereinafore-mentioned disadvantages of the heretofore-known devices of this general type, which ensures a secure retention of the storage cells and at the same time makes it possible for each storage cell to be cooled or heated in the required way.

With the foregoing and other objects in view there is provided, in accordance with the invention, a high-temperature storage battery, comprising a thermal insulation, inner and outer casing parts bounding the thermal insulation, the inner casing part defining an inner space, interconnected storage cells disposed in the inner space, at least one heating device and one cooling device for the storage cells, a sealing compound or a loose or bulk material in which the storage cells are embedded, and direct or indirect cooling devices for cooling the storage cells.

By embedding the storage cells in a sealing compound, which has the required mechanical stability after setting, a retention for the storage cells is provided which holds the storage cells in the desired position even under extreme conditions. The same effect is exhibited by a coarse-grained loose or bulk material into which the storage cells can be embedded. This loose material allows a direct cooling of the storage cells.

In accordance with another feature of the invention, the storage cells are adjacent each other and have intermediate spaces therebetween, the substance is a coarse-grained loose material filling the intermediate spaces, and the cooling devices include means for leading a liquid or gaseous coolant through the intermediate spaces for cooling the storage cells. The loose material forms an equal hydraulic resistance for the coolant, irrespective of whether it is gaseous or liquid. It is thereby ensured that the same quantity of coolant is led through all of the intermediate spaces and consequently a uniform cooling of the storage cells is achieved.

In accordance with a further feature of the invention, the storage cells are adjacent each other and have intermediate spaces therebetween, and the cooling devices include at least one latent heat accumulator disposed in each respective one of the intermediate spaces, in order to cool storage cells which are embedded in a sealing compound. These accumulators are constructed in such a way that they extend over the entire length of the intermediate space and contain a substance having a heat of fusion which lies somewhat above the operating temperature of the battery. The heat of fusion of these substances can be used for cooling, for example to compensate for the lost heat of the storage cells. Constructing high-temperature storage batteries with storage cells which are embedded in sealing compounds favors the use of such melting substances, since the sealing compounds effectively restrict the spread of reaction products from defective storage cells.

Consequently, the risk of violent reactions between the storage cell material and the latent heat accumulators is distinctly reduced. At the same time, the complexity of the mechanical fixing which is necessary for the thermal coupling of the latent heat accumulators to the storage cells is considerably lessened. The increase in weight of the high-temperature storage battery due to latent heat accumulators is offset by the absence of coolant.

According to the invention, there is the possibility of also directly cooling storage cells which are embedded in sealing compounds. Therefore, in accordance with an added feature of the invention, the storage cells have edge regions, the substance is a sealing compound, and the cooling devices include cooling channels integrated in the edge region of each of the storage cells. The cooling channels are adjacent the storage cells and adjacent the intermediate spaces between the storage cells.

In accordance with an additional feature of the invention, the storage cells are adjacent each other and have intermediate spaces therebetween, the storage cells each have a casing with a dish-shaped depression formed therein over the entire length of the storage cells forming the cooling channels, and there are provided walls extending over the entire length of the depression being convexly curved into the interior of the intermediate spaces and each outwardly bounding a respective one of the depressions towards a respective one of the intermediate spaces, the walls being mechanical retained in a desired position by the sealing compound or loose material being filled into the intermediate spaces.

In accordance with yet another feature of the invention, the sealing compound has through-bores formed therein extending over the entire length of the intermediate spaces for forming the cooling channels within each of the intermediate spaces.

In accordance with yet a further feature of the invention, the cooling channels have first and second ends, and there are provided at least one distributing space connected to the first end and a collecting space connected to the second end for coolant. Storage cells which are embedded in sealing compounds can be cooled both by separately installed heat exchangers and by integrated heat exchangers. If integrated heat exchangers are used, heat exchange tubes are disposed in the intermediate spaces between neighboring storage cells. Gaseous or liquid heat exchange media are led through these tubes. According to the invention, there is the possibility of forming these heat exchange tubes by means of channels which are directly bounded by the sealing compound. The heat exchange tubes or these channels in the intermediate spaces are adjoined by collecting and distributing spaces, from which the heat exchange media are led through the tubes or channels. The distribution of the heat exchange media can be controlled by means of hydraulic resistances. An integrated cooling system with an integrated heat exchanger combines essential advantages of direct cooling and indirect cooling. On one hand, the cooling system itself is closed. A direct contact between the heat exchange medium and the storage cell is avoided. On the other hand, heat given off by the storage cell is carried away over the entire length of the storage cell, which reduces the vertical temperature gradients of the storage cells. The heat exchangers can be disposed at all of the bounding surfaces of the storage cell block, which is also known as a cell matrix. The cell matrix may also be divided into a plurality of parts, in order to place heat exchangers between these parts. However, it is particularly advantageous to install the heat exchangers above and below the cell matrix, since this is virtually the only way for all of the storage cells to be at the same distance from the heat exchanger. Only in this way can an even temperature distribution in the cell matrix be achieved. According to the invention, the battery may be constructed in such a way that the inner wall of the insulation, which bounds the battery, at the same time forms the outer bounding wall of the heat exchanger. The bottom or cover surface of the cell matrix, which lies opposite this bounding wall, can then form the inner bounding wall of the heat exchanger. In order to improve the vertical temperature profile in the storage cell block and its thermal coupling to the heat exchanger or heat exchangers, bars of a good heat conducting material may be embedded in the sealing compound. The bars run parallel to the storage cells, are just as long as them and are additionally connected to the heat exchanger. It is possible to equip high-temperature storage batteries which are constructed for particularly high continuous duty with a combined system of integrated cooling with a separate heat exchanger and integrated latent heat accumulators. The heating-up and maintaining of the idle temperature of the high-temperature storage batteries is possible in all cases by means of electrically operated heating elements. These heating elements may be integrated into the heat exchangers.

In accordance with yet an added feature of the invention, the cooling devices are at least one heat exchanger in direct heat-conducting contact with the storage cells.

In accordance with yet an additional feature of the invention, the storage cells have bottom portions and cover portions, and at least one of the portions of each of the storage cells is in direct heat-conducting contact with at least one of the at least one heat exchanger.

In accordance with again another feature of the invention, the storage cells are held together to form a storage cell block, and the at least one heat exchanger is directly adjacent the storage cells in the block.

In accordance with again a further feature of the invention, the inner casing part has bottom and cover surfaces, at least one of the surfaces has double walls, and the at least one heat exchanger is disposed between the walls.

In accordance with again an added feature of the invention, the double walls have an innermost wall constructed as a perforated plate.

In accordance with again an additional feature of the invention, each of the at least one heat exchanger is constructed as bags of metal foils through which coolant flows, the bags being pressed against adjacent surfaces in a heat-conducting manner during coolant flow.

In accordance with still another feature of the invention, there are provided rods of a good heat conducting material being disposed between the storage cells of the storage cell block to form a vertical temperature profile, the rods extending over the entire length of the storage cells and being in connection with at least one of the at least one heat exchanger.

In accordance with a concomitant feature of the invention, there are provided heating elements integrated in the at least one heat exchanger to compensate for heat losses.

Other features which are considered as characteristic for the invention are set forth in the appended claims.

Although the invention is illustrated and described herein as embodied in a high-temperature storage battery, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
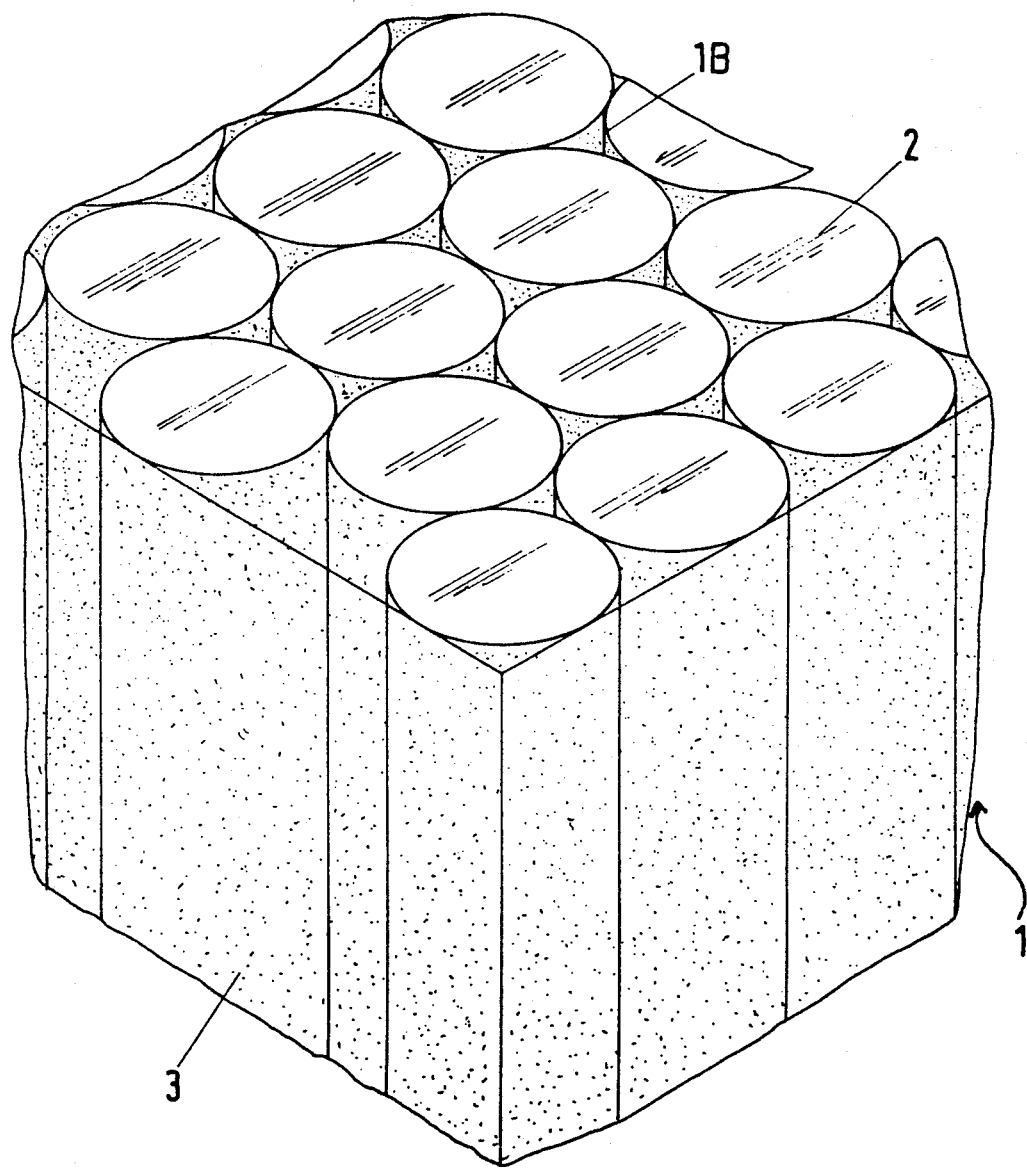
FIG. 1 is a fragmentary, diagrammatic, perspective view of a partial region of a storage cell block which is disposed in a high-temperature storage battery.

Referring now to the figures of the drawing in detail and first, particularly, to FIG. 1 thereof, there is seen a partial region of a storage cell block 1B, which is also known as a cell matrix, as it is disposed inside a high-temperature storage battery 1. Storage cells 2, which are diagrammatically represented, are embedded in a set sealing compound 3. According to the invention, the sealing compound is formed by a mixture which includes a thermoset resin and one or more filler materials. The mechanical stability of the sealing compound 3 is so great that the storage cells 2 are held in the desired position even under extreme conditions, and cannot break away from the storage cell assembly. As already stated at the above, the storage cells 2 of each high-temperature storage battery 1 have to be cooled during the operation of the high-temperature storage battery 1. If the high-temperature storage battery is one which is operated with little continuous duty, latent heat accumulators may be used for cooling according to the invention.

Figure 2:
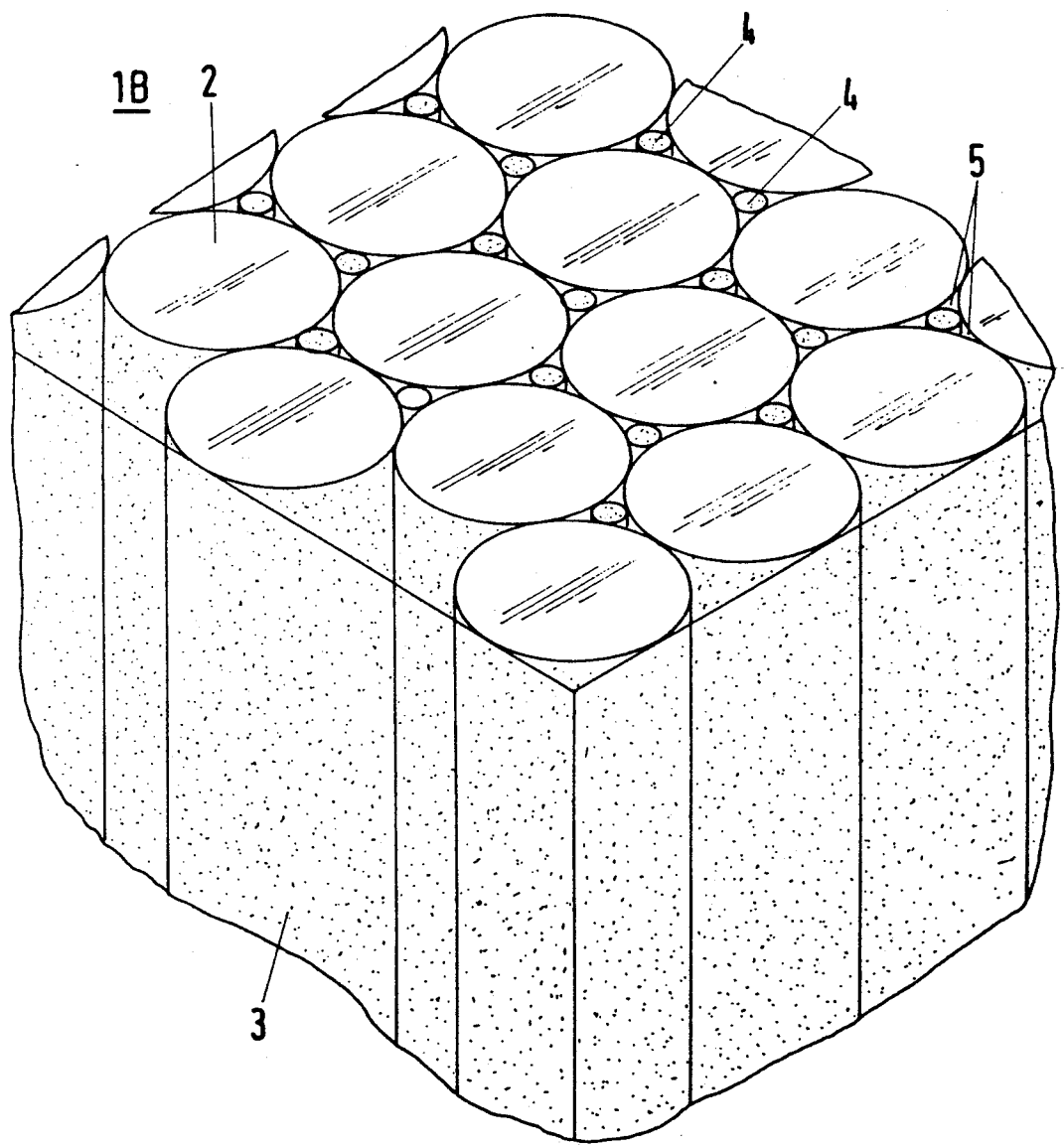
FIG. 2 is a view similar to FIG. 1 of storage cells between which latent heat accumulators are disposed.

As can be seen from FIG. 2, a latent heat accumulator 4 is disposed in each intermediate space 5 which remains between three neighboring storage cells 2 in each case. The accumulator is bounded by a cylindrical casing, which is closed at the ends. The length of the cylindrical casings is adapted to the length of the storage cells 2. The latent heat accumulators 4 are disposed centrally in the intermediate spaces 5 and are likewise embedded in the sealing compound 3. The latent heat accumulators 4 are preferably filled with a non-illustrated material having a melting temperature which lies somewhat above the operating temperature of the storage cells 2. For example, the latent heat accumulators 4 may be filled with a eutectic LiCl/KCl mixture. The heat which is required for melting this material is drawn from the storage cells 2, thereby cooling the latter or compensating for their lost heat.

Figure 3:
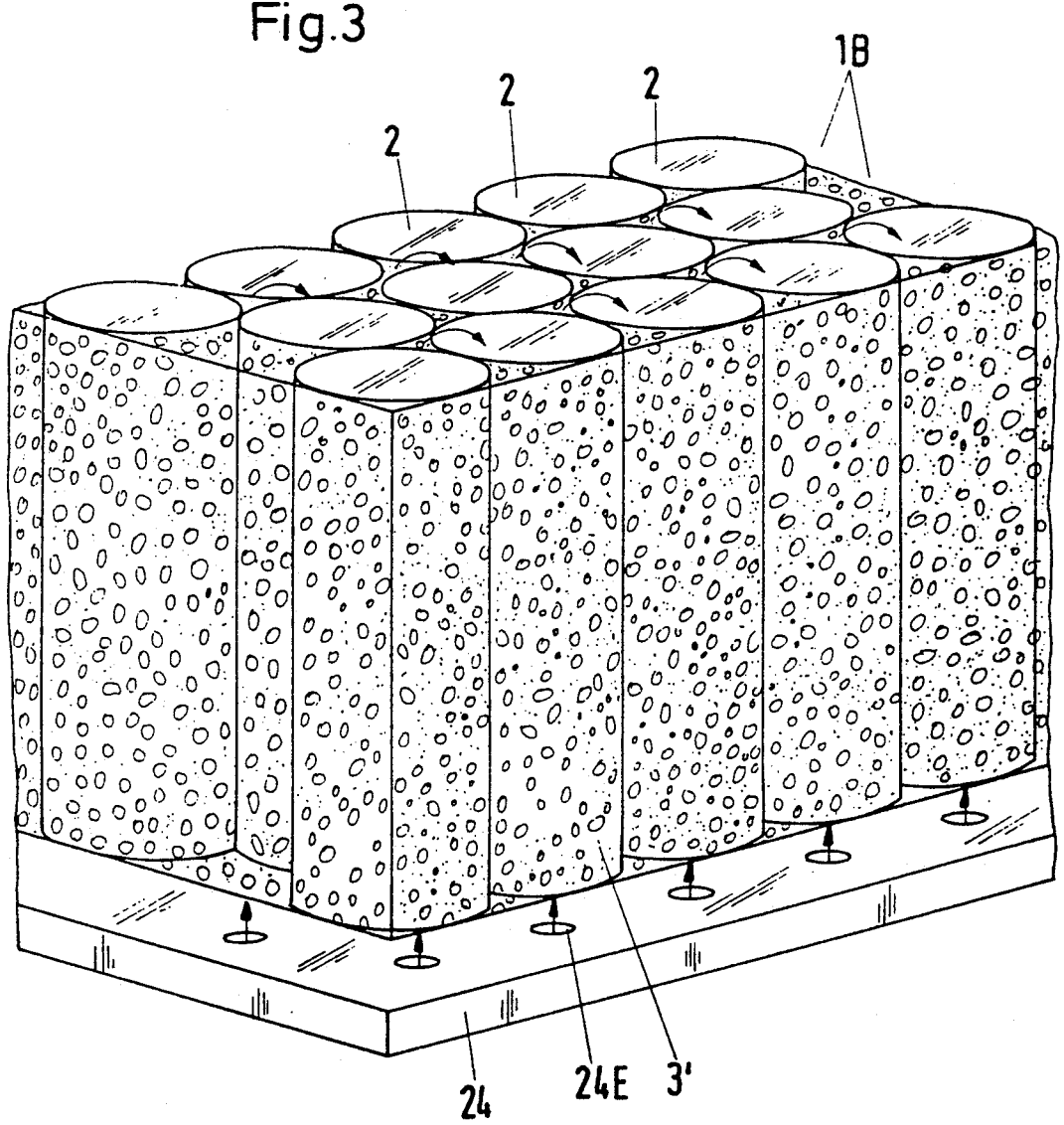
FIG. 3 is a fragmentary perspective view of storage cells which are embedded in coarse-grained loose material.

FIG. 3 shows how a storage cell block 1B can be fixed in a high-temperature storage battery. First of all, the storage cells 2 are disposed in a non-illustrated battery box and embedded in a coarse-grained loose or bulk material 3'. The material 3 is formed of quartz sand or aluminum oxide. The grain size of the loose material 3' is 0.5-2 mm. Remaining hollow spaces are likewise filled with the loose material. In order to cool the storage cells 2, a cooling medium, which is gaseous or liquid, is led through the loose material 3' past the storage cells 2. As FIG. 3 shows, the cooling medium may be supplied to the storage cell block 1B via a distributor plate 24. The distributor plate 24 is provided with openings 24E. The size of the openings 24E and their distribution on the distributor plate 24 is determined by the quantity of the coolant which is to be supplied to each storage cell 2 in order to achieve adequate cooling of the same. Since the loose material 3' is coarse-grained, the cooling medium can be led through without any problems. Due to the uniform graining of the loose material 3', a uniform hydraulic resistance for the cooing medium is provided all over, so that as a result, a uniform distribution of the same over all of the storage cells 2 is achieved.

Figure 4:
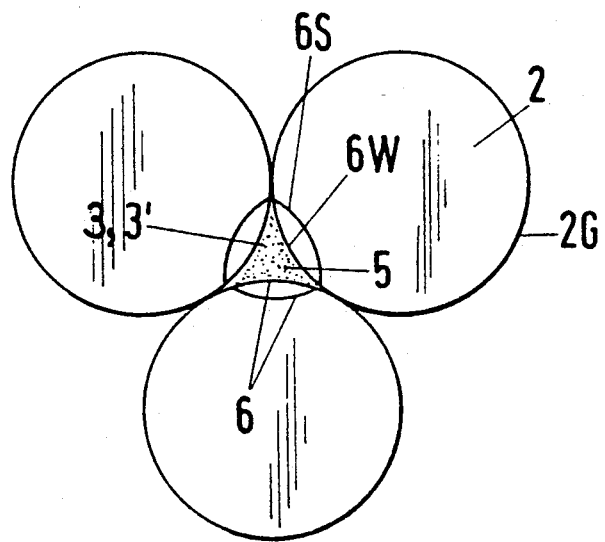
FIG. 4 is a plan view of channels for leading-through coolant between adjacently disposed storage cells.

If the high-temperature storage battery 1 is operated with high continuous duty, the cooling of its storage cells 2 is to be adapted to this fact. This means that a more intensive cooling of the storage cells 2 is required. Since latent heat accumulators and the direct leading of the cooling medium through the loose material are not suitable for intensive cooling, cooling channels 6 which are directly adjacent the storage cells 2 are formed for this purpose. FIG. 4 shows an embodiment of these cooling channels 6. The storage cells 2 are embedded in the same way in the loose material 3' or the sealing compound 3, as shown in FIGS. 1 and 3. The cooling channels 6 are disposed in the vicinity of the intermediate spaces 5, which are produced between three neighboring storage cells 2 in each case. In order to form these cooling channels 6, a casing 2G of each storage cell 2 has a dish-shaped depression 6S formed therein. This extends over the entire length of the storage cell 2. In order to effect a second bounding or boundary of each cooling channel 6, a convexly curved wall 6W is disposed in front of each dish-shaped depression 6S. This wall 6W likewise extends over the entire length of the storage cell 2. By filling the intermediate space 5 with loose material 3' or with the sealing compound 3, the walls 6W are held in the desired position. This ensures a closing-off of the cooling channels 6 from the rest of the intermediate space 5.

Figure 5:
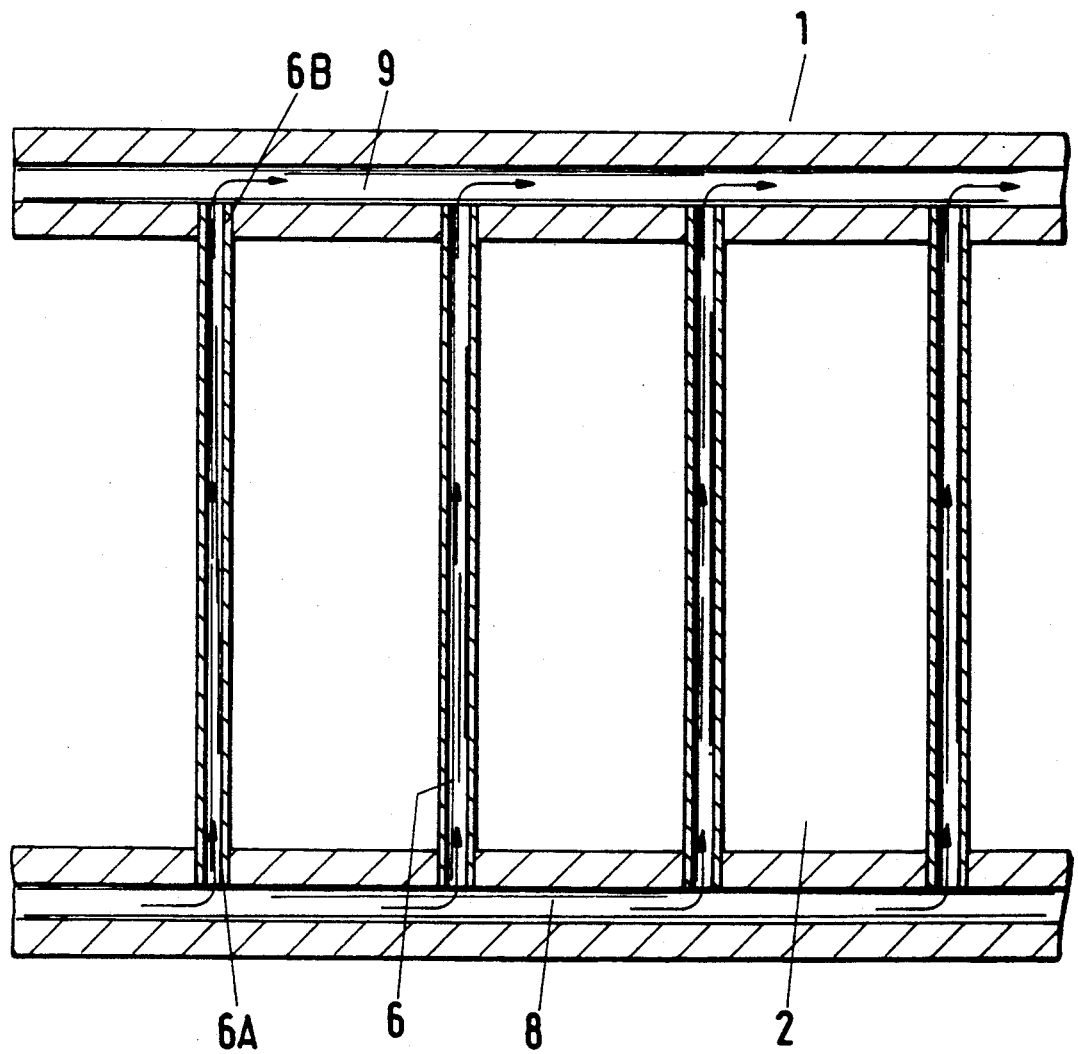
FIG. 5 is a fragmentary, longitudinal-sectional view of collecting and distributing devices for the coolant inside a high-temperature storage battery.

The distribution of the coolant takes place through collecting and distributing spaces, as are shown in FIG. 5. At least one distributing space 8 which is in communication with first ends 6A of the cooling channels 6, is disposed at the lower surface of the storage cell block 1B. The coolant is introduced into the space 8 from outside and taken past the storage cells 2 through the cooling channels 6. Above the storage cell block 1B is a collecting space 9, which receives the coolant flowing out of second ends 6B of the channels 6. From the collecting space 9, the coolant is led out of the high-temperature storage battery 1 again to the outside.

Figure 6:
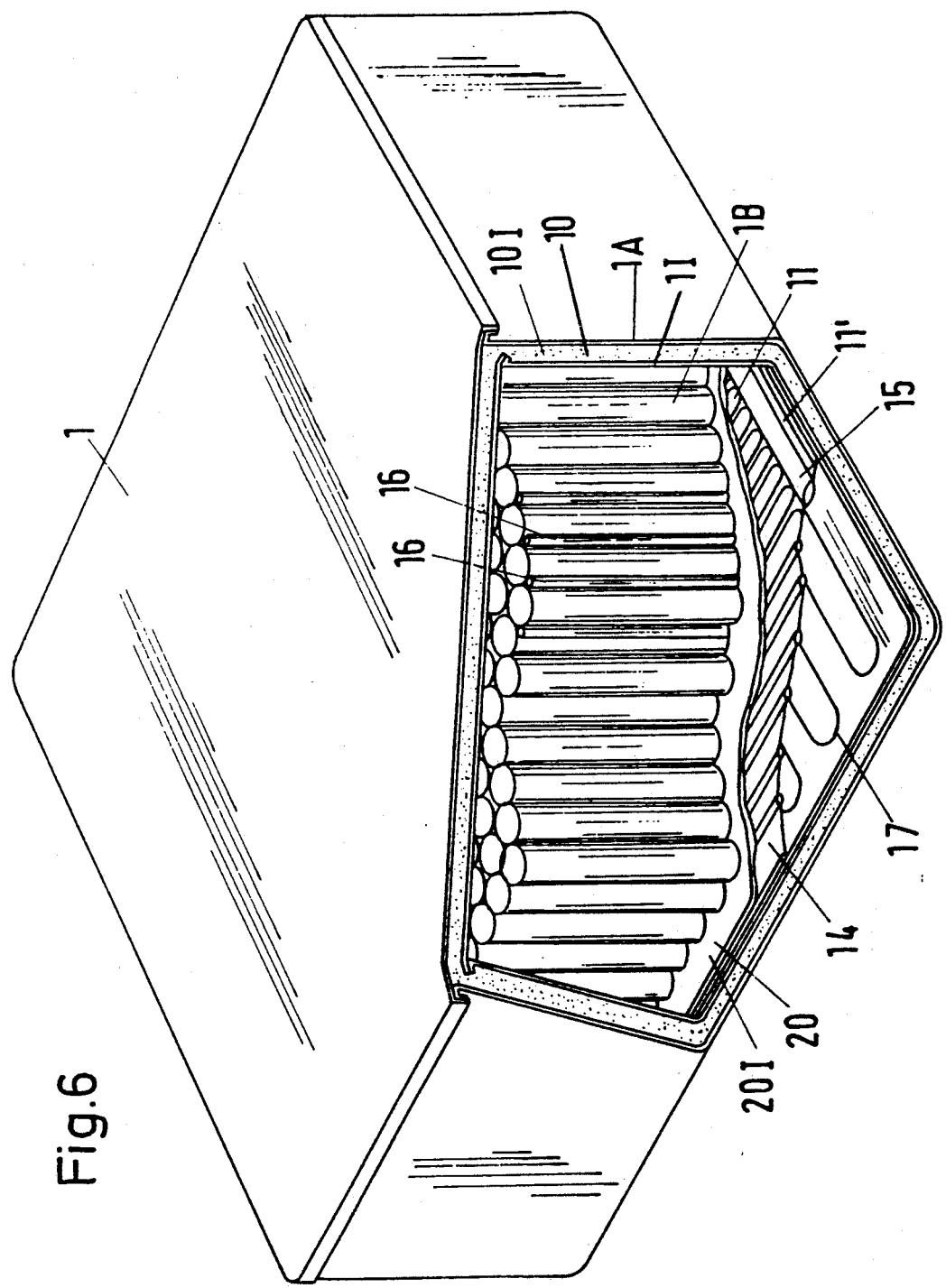
FIG. 6 is a partially broken-away perspective view of a high-temperature storage battery with built-in heat exchangers.

FIG. 6 shows a high-temperature storage battery 1, inside which a storage cell block 1B is disposed. The cooling of the storage cells 2 takes place by means of one or more heat exchangers 11. In the case of the exemplary embodiment shown herein, only one heat exchanger 11 is provided. The heat exchanger 11 is disposed at the lower surface of the storage cell block 1B. If circumstances so require, a further non-illustrated heat exchanger may also be disposed above the storage cell block 1B. If necessary, further heat exchangers may be disposed on the lateral bounding or boundary surfaces of the storage cell block 1B.

The high-temperature storage battery according to FIG. 6 is bounded or bordered by outer and inner casing parts 1A, 1I. The dimensions of the inner casing part 1I are chosen to be smaller so that a space 10, which is evacuated and filled with insulating material 10I, is produced between the two casing parts 1A and 1I. In order to cool the storage cells 2 of the storage cell block 1B, another heat exchanger 11' is in heat-conducting contact with the bottom of the storage cell block 1B having the storage cells 2. In the case of the exemplary embodiment shown herein, the inner casing part 1I is of a double-walled construction in the vicinity of the bottom thereof defining a doubled bottom 20. The heat exchanger 11' is disposed between the walls of the doubled bottom 20.

If the storage cells 2 of the storage cell block 1B are embedded in a sealing compound, there is the possibility of placing the heat exchanger 11 directly adjacent the lower surface of this storage cell block 1B. The heat exchanger 11 is formed of bags 14, which are in turn formed by metal foils. The bags are constructed in such a way that cooling medium can flow through them. As shown in FIG. 6, supply lines 15 for the coolant are fastened to the metal foils. If the non-illustrated coolant is pumped through the bags 14, the bags 14 bear firmly against the lower surface of the storage cell block 1B. As a result, a close heat-conducting contact is accomplished between the storage cells 2 and the heat exchanger 11.

According to the invention, an inner bounding or boundary surface or innermost wall 201 of the inner casing part 1I may also be constructed as a non-illustrated perforated plate. If cooling medium flows through the bags 14 (as described above), the bags are pressed against the perforated plate. This likewise produces a close heat-conducting contact between the heat exchanger 11 and the storage cell block or the individual storage cells 2. According to the invention, such heat exchangers 11 may also be installed above the storage cell block 1B in a corresponding non-illustrated way. The embodiment of the heat exchangers 11 described in this case and the formation of a close contact of the heat exchangers with the storage cells 2 is not confined to this embodiment. Rather, it includes all of the possibilities by which a close contact between heat exchangers and storage cells may be achieved.

In order to improve the vertical temperature profile in the storage cell block 1B and the thermal coupling of the heat exchangers to the storage cells, rods 16 of a material which conducts well, preferably copper, are embedded in the sealing compound. These rods 16 are in direct contact with the heat exchangers, such as the heat exchanger 11.

According to the invention, there is the possibility of equipping the high-temperature storage batteries which are intended for a particularly high continuous duty with a combined system, including indirect cooling, one or more separate heat exchangers and additional latent heat accumulators disposed between the storage cells. In order to ensure that the required minimum temperature is maintained during idle periods of the high-temperature storage batteries, heating elements 17 may be integrated, for example in the heat exchanger such as the heat exchangers 11, as shown in FIG. 6, which then provide for the required heat supply.

We claim:

1. High-temperature storage battery, comprising a thermal insulation, inner and outer casing parts bounding said thermal insulation, said inner casing part defining an inner space, interconnected storage cells disposed in said inner space, at least one heating device and one cooling device for said storage cells, a substance in which said storage cells are embedded, said storage cells being adjacent each other and having intermediate spaces therebetween, said substance being a coarse-grained bulk material filling said intermediate spaces, and said at least one cooling device including means for leasing a liquid or gaseous coolant through said intermediate spaces for cooling said storage cells.

2. High-temperature storage battery, comprising a thermal insulation, inner and outer casing parts bounding said thermal insulation, said inner casing part defining an inner space, interconnected storage cells disposed in said inner space, at least one heating device and one cooling device for said storage cells, said storage cells being adjacent each other and having intermediate spaces therebetween, said storage cells each having a casing with a dish-shaped depression formed therein over the entire length of said storage cells forming said cooling channels, and convexly curved walls each outwardly bounding a respective one of said depressions towards a respective one of said intermediate spaces, said walls being held in a desired position by a sealing compound filled into said intermediate spaces, said cooling channels having first and second ends, and at least one distributing space communicating with said first end and a collecting space communicating with said second end for coolant.

3. High-temperature storage battery, comprising a thermal insulation, inner and outer casing parts bounding said thermal insulation, said inner casing part defining an inner space, interconnected storage cells disposed in said inner space, at least one heating device and one cooling device for said storage cells, a sealing material or a bulk material in which said storage cells are embedded, and said cooling device being at least one heat exchanger in direct heat-conducting contact with said storage cells.

4. High-temperature storage battery according to claim 3, wherein said storage cells have bottom portions and cover portions, and at least one of said portions of each of said storage cells is in direct heat-conducting contact with at least one of said at least one heat exchanger.

5. High-temperature storage battery according to claim 3, wherein said storage cells are held together to form a storage cell block, and said at least one heat exchanger is directly adjacent said storage cells in said block.

6. High-temperature storage battery according to claim 3, wherein said inner casing part has bottom and cover surfaces, at least one of said surfaces has double walls, and said at least one heat exchanger is disposed between said walls.

7. High-temperature storage battery according to claim 3, wherein said double walls have an innermost wall constructed as a perforated plate.

8. High-temperature storage battery according to claim 3, wherein each of said at least one heat exchanger is constructed as bags of metal foils through which coolant flows, said bag being pressed against adjacent surfaces in a heat-conducting manner during coolant flow.

9. High-temperature storage battery according to claim 3, including rods of a heat conducting material being disposed between said storage cells of said storage cell block to form a vertical temperature profile, said rods extending over the entire length of said storage cells and being in connection with at least one of said at least one heat exchanger.

10. High-temperature storage battery according to claim 3, including heating elements integrated in said at least one heat exchanger to compensate for heat losses.

11. High-temperature storage battery, comprising a thermal insulation, inner and outer casing parts bounding said thermal insulation, said inner casing part defining an inner space, interconnected storage cells disposed in said inner space adjacent each other and having intermediate spaces therebetween, at least one heating device and one cooling device for said storage cells, a sealing compound in which said storage cells are embedded, said sealing compound being provided with through-bores within each intermediate space, said through-bores extending over the entire length of said intermediate spaces for forming cooling channels within each of said intermediate spaces, said cooling channels having first and second ends, and including at least one distributing space communicating with said first end and a collecting space communicating with said second end for coolant.

12. High-temperature storage battery, comprising a thermal insulation, inner and outer casing parts bounding said thermal insulation, said inner casing part defining an inner space, interconnected storage cells disposed in said inner space, at least one heating device and one cooling device for said storage cells, a sealing compound in which said storage cells are embedded, said storage cells having intermediate spaces therebetween, and said cooling devices including at least one latent heat accumulator disposed in each respective one of said intermediate spaces.

* * * * *